Aug. 5, 1952     C. F. CLIFFORD ET AL     2,606,222
ELECTRIC MOTOR
Filed Aug. 16, 1948     2 SHEETS—SHEET 1
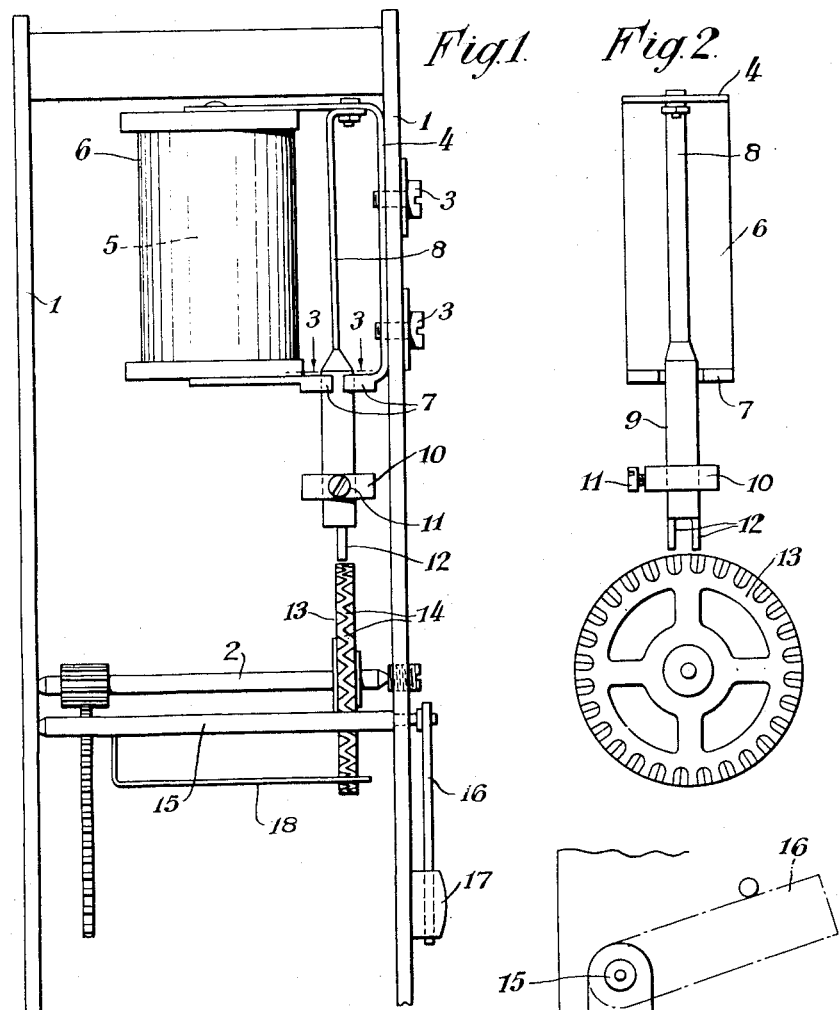
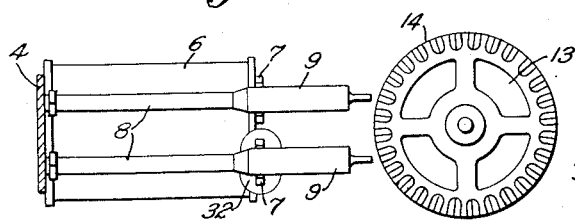
INVENTORS
CECIL F. CLIFFORD
FREDERICK O. HORSTMANN Aug. 5, 1952  C. F. CLIFFORD ET AL  2,606,222
ELECTRIC MOTOR
Filed Aug. 16, 1948  2 SHEETS—SHEET 2
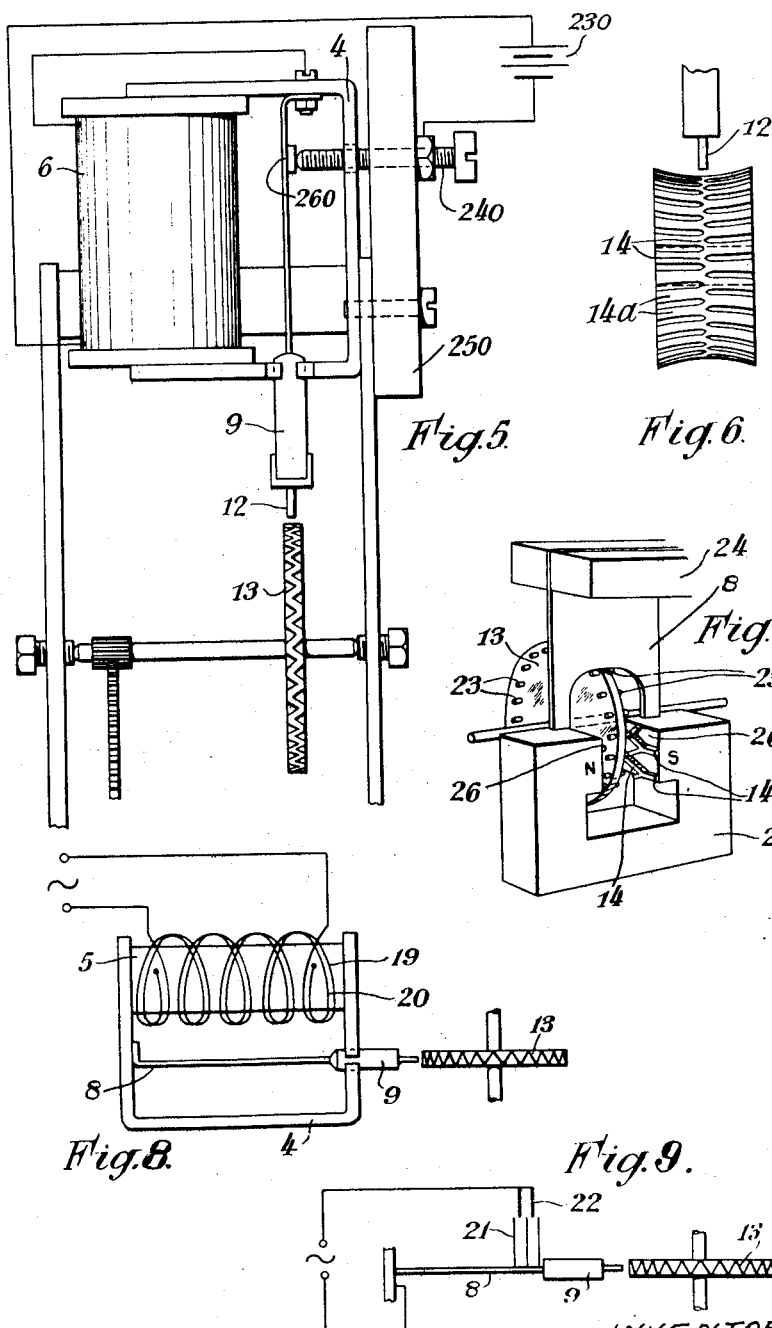
INVENTORS
CECIL F. CLIFFORD
FREDERICK O. HORSTMANN Patented Aug. 5, 1952

2,606,222

UNITED STATES PATENT OFFICE 2,606,222

ELECTRIC MOTOR

Cecil Frank Clifford and Frederick Otto Horstmann, Bath, England

Application August 16, 1948, Serial No. 44,524 In Great Britain August 26, 1947

15 Claims. (Cl. 172—126)

This invention relates to small electric motors and comprises a new or improved motor suitable for driving electric clocks, for controlling synchronous movements and for the like purposes.

The invention consists in a motor comprising a pair of relatively rotatable members, an electrically driven oscillatory or vibratory device such as a reed attached to one of the members, a magnetic element or system attached to the oscillatory device and a cooperating magnetic element or system attached to the other of the members, one of the magnetic elements or systems being arranged in the form of a wavy magnetic track along which the other element or system is guided by magnetic forces for the purpose of converting the movement of the oscillatory device into a relative rotation of the members. One of the relatively rotatable members will normally be fixed whilst the other is carried upon a rotatable shaft arranged to drive a clock or other mechanism to be actuated. The oscillatory device may be carried on the rotatable member. To simplify the construction of the motor, however, it is ordinarily preferable to attach the oscillatory device to the fixed member.

A motor according to the invention may be made self starting by constructing it with a rotor of sufficiently low inertia, suitable provision being made if required for preventing it from starting in the wrong direction. Alternatively a starting device adapted to start the rotor in the required direction of rotation may be provided.

The nature of the invention and of the subsidiary features thereof and the manner in which the same is to be performed will be understood from the following description of a number of examples of electric motors embodying the invention, reference being made to the accompanying drawings in which corresponding parts are indicated by the same reference numerals in different figures, and in which:

Figure 1 is a view of one form of a motor for alternating current constructed according to the invention, Figure 2 is a fragmentary end view of the motor shown in Figure 1, Figure 3 is an enlarged fragmentary sectional view taken on the line 3—3 of Figure 1, Figure 4 is a fragmentary view taken at right-angles to Figure 1 and showing the operating lever of the starting mechanism, Figure 5 is a view similar to Figure 1 showing a modified motor adapted for working with direct current, Figure 6 is an enlarged elevation showing a modified form of rotor.

Figure 7 is a perspective view showing a modified arrangement of the rotor and oscillatory device in which the wavy magnetic path is formed by magnetic elements carried by the oscillatory device, Figure 8 is a diagrammatic illustration showing a special form of winding for an alternating current electromagnet used to drive the oscillatory device of a motor according to the invention and adapted to take a very small current from a high voltage supply such as a mains supply, Figure 9 is a diagrammatic illustration of a motor according to the invention employing an electrostatically actuated oscillatory device, Figure 10 illustrates one example of a split phase motor according to the invention.

The motor shown in Figures 1 to 4 of the drawings forms part of a synchronous electric clock having main frame plates 1 which carry a suitable gear train (not shown) for driving the hands of the clock from the driving spindle 2 of the electric motor.

Fixed to one of the frame plates 1, as by means of screws 3, is the motor stator which comprises an iron yoke 4 attached to a magnet core 5 on which is mounted a magnetising coil 6 adapted to be supplied with current from alternating-current mains. The yoke 4 is constructed to form an air gap between a pair of pole pieces 7 which thus become oppositely polarised during each alternation of the current in the coil 6.

The yoke 4 carries a vibratory reed 8 made of steel or other suitable spring material which is fixed at one end to the yoke and attached at its free end to a bar magnet 9 so that the reed 8 and magnet 9 form an oscillatory device adapted to oscillate at a natural frequency equal to or approximately equal to the frequency of the alternating current supply. One end of the magnet 9 is located in the air gap between the pole pieces 7 as shown and so that it moves towards each pole piece alternately as the reed vibrates.

As will be evident from the above description, the reed 8 and magnet 9 are adapted to be vibrated at a frequency equal to the frequency of the alternating-current supply by the alternate attraction and repulsion of the pole pieces 7. In order to facilitate accurate adjustment of the natural frequency of vibration of the reed and magnet to suit the frequency of the supply, a tuning collar 10 is mounted on the magnet 9 so that it can be adjusted along the magnet to vary the resonant frequency of the mechanical system. The tuning collar is adapted to be securely fixed in adjusted position by means of a clamping screw 11.

The free end of the magnet 9 carries a pair of pole pieces 12 which project towards and reach nearly to the periphery of a rotor 13 in the form of an iron disc or a wheel having an iron rim fixed to the spindle 2. This wheel or disc is formed by pressing or otherwise with radial corrugations so that its peripheral edge is sinuous and forms a wavy magnetic path 14 opposite the pole faces of the pole pieces 12. The two pole pieces 12 are spaced apart a distance equal to a whole multiple of the pitch of the waves formed in the edge of the wheel or disc, and are located very close to the edge but without touching it so that there is a very small air gap between each pole piece and the edge of the wheel or disc. The magnetic attraction between the pole pieces 12 and the rotor 13 therefore tends to guide the pole pieces along the wavy edge 14 of the rotor so that the magnet 9 and reed 8 will receive an oscillatory movement if the rotor 13 is rotated. Although the motor shown in Figures 1 and 4 has two pole pieces 12, it is not essential to have this number of pole pieces. The magnet 9 may have only one pole piece 12 or it may even have three or more pole pieces spaced apart by distances equal to whole multiples of the pitch of the waves formed by the wavy edge of the rotor.

The motor shown in Figures 1 to 4 of the drawings is provided with a starting device comprising a rock-shaft 15 carrying an operating lever 16 adapted to be raised by hand to the position shown in broken lines in Figure 4 and then allowed to fall to the position shown in full lines, where it is held by a springy stop plate 17 adapted to hold it frictionally against accidental movement. The rock shaft 15 carries a thin wire spring 18 bent at right-angles as shown and arranged to engage the edge of the rotor 13 when the arm 16 is moved to the position shown in broken lines. When the arm 16 is released, after it has been moved to the position shown in broken lines, the shaft 15 is rotated clockwise as seen in Figure 4 by the weight of the arm, so that the wire spring 18 imparts a partial rotation to the rotor 13 for the purpose of starting it. The wire spring 18 is arranged so that it is out of contact with the rotor when the arm 16 is in the position shown in full lines in Figure 4 and thus does not interfere with the movement of the rotor during normal running.

When the current supply is switched on, the reed 8 and magnet 9 vibrate at the frequency of the alternating current supply owing to the alternate attraction and repulsion of the pole-pieces 7. It will be evident that there is a certain synchronous speed for the rotor 13 (depending upon the frequency of vibration of the reed and the angular pitch of the waves in the edge of the rotor), such that the pole pieces 12 will follow the wavy track 14 formed by the edge of the rotor 13 along which they are guided by the magnetic attraction between the pole pieces 12 and the wavy edge 13 of the rotor. The starting device is adapted to rotate the rotor initially at a speed approximately equal to or slightly above this synchronous speed. The rotor is then kept running at this speed by the action of the pole pieces 12 and rotates synchronously and with sufficient torque for driving the gear train and operating the hands of the clock. By providing a large number of undulations in the wavy magnetic track, it is possible to obtain a low rotor speed. For instance, a rotor speed of 60 R. P. M. may be obtained in a motor supplied with alternating current at 50 cycles per second by having 50 double undulations in the periphery of the rotor.

In the construction shown in Figures 1 to 4, the bar magnet 9 serves as the magnetic element by which the oscillatory device is coupled to the rotor and also as a polarised armature by means of which the oscillatory device is driven from the alternating-current magnet 4. However it is possible to employ an armature separate from the magnet 9 for cooperating with the magnet 4, and such armature may or may not be polarised.

The wavy magnetic path has an inherently smooth and continuous guiding action as distinct from a series of sharp impulses. To take full advantage of this and thus to obtain the highest possible efficiency, the motor should be designed to run with as little variation in the length of the air gap between the oscillatory device and the rotor as is practicable with due regard to the cost of manufacture. It is an advantage of the invention, however, that small errors or irregularities in the form of the magnetic path are easily accommodated and it is not necessary to work to the close tolerances required for mechanism having moving parts in sliding contact with one another. Moreover, the oscillatory movement is converted into rotary movement without the frictional losses inseparable from mechanism having moving parts in sliding contact with one another and this enables an efficient motor of very low power to be produced. For instance a power output of the order of 2 gm. cm. per second sufficient to drive a gear train can be obtained with an electrical input of the order of .002 volt-amps. An efficiency as high as 20% has been achieved in a motor having a current consumption (applied to the exciting coil) of .00135 volt-amps.

To avoid the difficulties of manufacture of a coil 6 of such small current consumption for connection directly across ordinary supply mains, the coil may be connected to the mains through a series-connected condenser by which the voltage across the coil is reduced to a low value. As an example, a coil of 1700 turns having a resistance of 48 ohms may be connected to 230 volt 50 cycles mains through a .05 microfarad condenser so as to obtain a voltage of 0.3 volt across the coil and a current of .0045 ampere, giving 7.7 ampere-turns.

It will be observed that the motor shown in Figures 1 to 4 of the drawings is arranged so that the magnetic attraction between the magnetic element 12 on the oscillatory device and the cooperating magnetic element 14 on the rotor tends to lift the rotor and thus supports some or all of its weight. The rotor is thus magnetically suspended and it has been found that a material saving of power loss due to bearing friction can be achieved by adjusting the mechanism so that the whole or part of the weight of the rotor is supported in this way. A motor according to the invention in which the rotor is thus magnetically suspended may have an oscillation device of lower power than would be necessary to drive the rotor if its weight were entirely supported by its bearings.

Figure 8 of the drawings illustrates a form of exciting winding suitable for direct connection to supply mains which may be used in accordance with the invention. The method of constructing this winding is as follows: Two strips of metal foil 19 and 20 separated by insulating material such as paper are wound on the bobbin so as to make say 100 turns. One end of one strip is brought out to one terminal and the opposite end of the other strip is brought out to the other terminal so that the construction forms a condenser in which the charging current flows in the same direction round the two coils formed by the two strips. The bobbin thus forms a magnetising coil which may take a leading current of say 0.1 ampere and have a magnetising power of say 10 ampere-turns.

Figure 9 of the drawings illustrates another modification in which the electromagnetic system for vibrating the reed is dispensed with and the reed is driven instead by electrostatic forces. In this modification the reed is secured at its fixed end to a convenient part of the frame or base of the motor and carries a number of moving electrodes (represented in the drawing by the condenser armature 21) cooperating with a number of fixed electrodes (represented by the condenser armature 22) arranged so that the electrostatic capacity between the two sets of electrodes is varied as the reed vibrates. The fixed and moving electrodes are connected to opposite terminals of an alternating current supply. The fixed electrodes may interleave with the moving electrodes and may be arranged in two sets so as to form two condensers one of which increases in capacity as the moving electrodes move towards one set of fixed electrodes during one half cycle of the vibratory movement of the reed whilst the other increases in capacity when the moving electrodes move towards the other set of electrodes during the other half cycle. This arrangement enables the reed to receive two impulses during each complete cycle of tis movement and thus to vibrate at the frequency of the alternating-current supply. If the electrodes are arranged to form only one condenser the capacity of which is a maximum in one extreme position of the reed and a minimum in the other position, the reed will receive only one impulse in each complete cycle of its movement, and must therefore have a resonant frequency equal to approximately twice the current supply frequency, since the condenser will supply two impulses during each cycle of the current supply.

Figure 5 of the drawings shows a motor which is generally similar to that shown in Figures 1 to 4 but is adapted for operation from a direct current supply, for instance a battery 230. The exciting winding 6 is connected to the current source 230 through an interrupter comprising an adjustable contact screw 240 carried by an insulating base 250 provided for it on the fixed frame member 1 and projecting through a clearance hole in the yoke 4 towards a cooperating contact member 260 provided on the reed 8. The contact screw 240 is adjusted so that the system operates in the manner of an electric bell trembler to cause vibration of the reed 8 and magnet 9. The vibratory movement of the reed is converted into rotary movement of the rotor 13 as described with reference to Figure 1 of the drawing.

The wavy magnetic path 14 formed on the edge of the rotor 13 as shown in Figures 1, 2 and 5 is of approximately sine wave form corresponding to a predetermined amplitude of vibration of the reed 8 and magnet 9. Any deviation of the amplitude of vibration of the oscillatory device from that for which the path is designed must therefore cause variation in the length of the air gap between each pole piece 12 and the edge of the rotor. If the amplitude of vibration increases excessively, for instance due to excess applied voltage, the rotor may be pulled out of step and the motor may fail. Figure 6 of the drawings shows one example of a rotor formed with a wavy magnetic track which has extensions arranged to allow the oscillatory device to vibrate with increased amplitude without breaking the magnetic coupling between the wavy path and the magnetic element or elements that is or are guided therealong. The rotor shown in Figure 6 consists of an iron disc having a thickness considerably greater than the maximum amplitude of vibration of the oscillatory device with which it is intended to work. The wavy magnetic path is formed by milling grooves across the edge of the disc parallel to its axis. The grooves are regularly spaced round the periphery of the disc and are cut alternately from opposite sides of the disc, each groove extending half-way across the edge of the disc and terminating in a wedge-shaped end. The land between the ends of these grooves forms the wavy magnetic path 14 corresponding to that indicated by the same reference numeral in Figures 1 and 5 of the drawings, whilst the lands between adjacent grooves cut from the same side of the disc form extensions 14a connected to the wavy path 14 at the tops of the waves.

When the oscillatory device vibrates with an amplitude greater than that of the wavy path 14, the pole face or pole faces of the magnetic element or magnetic elements carried by the oscillatory device move along the extensions 14a at each end of their vibratory movement. A substantially constant air gap between the magnetic path on the rotor and the pole face or pole faces of the cooperating magnetic element or elements on the oscillatory device is thus maintained.

The rotor shown in Figure 6 might be made from a disc having a cylindrical outer surface, but in that case some variation in the length of the air gap between the pole piece 12 and the rotor would occur by reason of the fact that the pole piece 12 moves in a curved path. To obtain a more constant air gap between the pole-piece 12 and the rotor, it is advantageous to make the rotor from a disc whose outer surface is curved in the direction of the axis of the disc as shown, so as to conform more closely to the curved path along which the pole piece moves as the reed vibrates.

In the constructions so far described, the oscillatory device carries a magnetic element having one or more pole faces that are guided along an endless wavy magnetic path on the rotor. The same result can be obtained however by having one or more pole faces on the rotor that are guided along a wavy magnetic path formed on the oscillatory member. One example of a motor embodying this arrangement is illustrated in Figure 7 of the drawings. In the example shown in Figure 7, the rotor 13 consists of a disc made of non-magnetic and preferably non-conducting material, for instance a transparent material of the class known as plastics to which are fixed a number of magnetic pins 23 spaced at regular intervals round the periphery of the disc, each pin being fixed in the disc parallel to the axis of the driving shaft 2 and having two ends projecting from opposite sides of the disc.

The reed 8 in Figure 7 is carried by a fixed frame or base 24 so that it will vibrate in a plane normal to the axis of the rotor 13. At its free end it carries a horse-shoe magnet 25 arranged so that the edge of the rotor 13 projects into the gap between two opposed poles 26 of the magnet. The magnet 25 cooperates with an electromagnetic system (not shown) by which the reed 8 and magnet 25 are vibrated. This system may operate on the same principle as that used in the construction described with reference to Figures 1 to 4 or Figure 5.

Each of the poles 26 of the magnet 25 is formed with a projecting pole piece made in the shape of a wavy path 14 along which the pins 23 are guided as the disc 13 rotates and the magnet 25 vibrates. The length of the pins 23 is slightly less than the gap between the projecting pole pieces that form the wavy paths on the two poles 26 of the magnet so that each pin moves freely between the projecting pole pieces that form the wavy paths and so that there is a small air gap between the ends of the pin and the projecting pole pieces. It will be observed that the wavy path 14 in the construction shown in Figure 7 is not endless as is that indicated by the same reference numeral in Figures 1 and 2. It extends over a distance of precisely two complete wave lengths and terminates abruptly at its two ends. Nevertheless its action is continuous, because the pins 23 move successively into its range and there are always two pins 23 being guided along the path 14. The construction is such that each pin 23 moves into the range of the magnetic path 14 just as another pin 23 leaves it, so that the force of attraction between the magnetic path and the pin 23 leaving it (which produces a torque tending to oppose the rotation of the rotor) is counterbalanced by the force of attraction between the magnet path and the pin 23 entering it.

The rotor 13 in Figure 7 is thus coupled to the oscillatory device in essentially the same way as the rotors 13 of the constructions shown in Figures 1 to 5 are coupled to the oscillatory devices shown in those figures, and operates on the same principle. The wavy path 14 in Figure 7 is provided with extensions 14a similar to and serving the same purpose as those described with reference to Figure 6 of the drawings.

A multi-phase or split phase motor according to the invention can be constructed by providing two or more oscillatory devices adapted to operate in a predetermined phase relation cooperating with a single rotor and arranged in positions spaced apart along the wavy magnetic path according to the phase relation between the several oscillatory devices. An example of a split-phase motor according to the invention is illustrated in Figure 10. In this construction, a yoke 4 carrying an exciting coil 6 is used which is similar to that described with reference to Figures 1 to 4, but is adapted to accommodate two reeds 8 each of which carries a magnet 9 operating in a separate gap between a separate pair of pole pieces 7 provided for it in the yoke. One of the pole pieces 7 cooperating with one of the magnets 9 is surrounded by a copper ring or disc 32 so that the well-known "shaded pole" effect is obtained, with the result that there is a phase displacement between the vibratory movements of the two reeds 8 and magnets 9. The pole pieces 12 on the magnets 9 are spaced apart along the wavy track 14 of the rotor 13 with which they cooperate by a distance chosen to suit the phase displacement between the vibratory movements. If the exciting coil 6 is supplied with alternating current maintained accurately at the correct frequency, the two reeds 8 will vibrate with a phase displacement corresponding to the difference between their relative positions along the wavy track on the rotor 13. They will therefore cooperate to drive the rotor 13. A multi-phase or split phase motor according to the invention has the special advantage that it can be made self starting and will operate in one direction of rotation only.

A motor constructed according to the present invention is capable of operating as an escapement in which the vibrations or oscillations of the vibratory or oscillatory member are maintained by the rotation of the rotor and regulate the speed of rotation thereof. This property of the motor may be utilised in a synchronous electric clock or other synchronous movement to enable the clock or movement to operate under the action of a driving spring or weight in the event of a break in the current supply. The invention therefore includes a synchronous movement such as a synchronous electric clock mechanism in which a motor comprising a vibratory or oscillatory member and a rotor adapted to operate as described above is arranged to act alternatively either for driving the clock mechanism from A. C. mains or for regulating the movements of the clock mechanism when driven by a spring or weight.

It is not necessary for the magnetic element carried by the vibratory or oscillatory member to be a permanent magnet. The element or elements forming the magnetic track may be permanently magnetised instead, or the magnetism may be induced by a permanent magnet or magnetising winding arranged in any convenient manner. Moreover, the vibratory or oscillatory element need not be a reed but may be, for instance, a pendulum.

The magnetic elements of the motor that are not permanently magnetised are preferably made of a low-loss magnetic alloy. Wherever for simplicity the word iron has been used in this specification this can mean any magnetisable material preferably one of the low-loss alloys such as that known by the registered trade-mark "Mumetal."

We claim:

1. In a motor mechanism, a stationary member, a rotor member, a vibratory device attached to one of said members, a magnetic element carried by said device, a second cooperating magnetic element carried by the other member, one of said magnetic elements being in the form of a wavy magnetic track along which the other element is guided by magnetic forces to effect rotation of the rotor at an even constant speed determined by the frequency of vibration of the vibratory device and the pitch of the wavy track, and electric means for vibrating said vibratory device.

2. A motor mechanism comprising a support, an oscillating member carried thereby, a rotor member, means for operatively mounting the latter, a magnetic element attached to one of said members, a cooperating magnetic element attached to the other of said members, one of said magnetic elements being in the form of a wavy magnetic path and the other of said elements being disposed in juxta-position to said path to be guided by magnetic forces to effect continuous rotation of the rotor at a constant speed determined by the frequency of the vibration of the vibratory device and the pitch of the wavy path, and electric means for oscillating said oscillatory member.

3. A motor mechanism as in claim 1 wherein the electrical means for vibrating the vibratory device comprises an alternating current electromagnet and an armature actuated thereby and attached to the vibratory device.

4. A motor mechanism as in claim 1 wherein the electrical means for vibrating the vibratory device comprises a magnetic armature attached to said device, an electro-magnet actuating said armature, and means for supplying current intermittently to the electro-magnet.

5. A motor mechanism as in claim 1 wherein the electrical means for vibrating said vibratory device comprises an electro-magnet having a winding including a pair of conductive strips insulated from one another to form a condenser and the core of said magnet being magnetized by the flow of charging current through the conductive strips.

6. A motor mechanism according to claim 1 wherein the electrical means for vibrating the vibratory device comprises condenser plates attached to said vibratory device and to a fixed part of the motor, said condenser plates being arranged so that the electro-static capacity between those attached to the fixed part and those attached to the vibratory member varies as the latter vibrates.

7. A motor mechanism according to claim 1 wherein the wavy magnetic track has extensions to allow the vibratory member to vibrate with increased amplitude without breaking the magnetic coupling between the magnetic elements of the wavy magnetic path and that of the vibratory device.

8. A motor mechanism according to claim 1 wherein the vibratory device comprises a plurality of vibrating members arranged to operate with a relative phase displacement one to another.

9. A motor mechanism according to claim 1 wherein the rotor is so arranged that the magnetic attraction between the magnetic elements on the vibratory device and on the rotor supports at least in part the weight of the rotor to reduce the load on the rotor bearings.

10. A motor mechanism as claimed in claim 1 wherein the wavy magnetic path is provided upon the rotor member and is constructed of a low-loss magnetic alloy.

11. A motor mechanism according to claim 7 wherein the wavy magnetic path is formed upon the rotor by grooves across the peripheral face of the rotor parallel to the axis of rotation, the grooves extending inwardly and alternately from opposite sides of the rotor, said grooves terminating in wedge-shaped ends arranged so that lands between the wedge-shaped ends form the wavy path and lands between adjacent grooves form the extensions thereof.

12. A motor mechanism according to claim 11 wherein the surface of the rotor in which the grooves are cut is of arcuate shape in cross section to conform to the curved path of the magnetic element on the vibratory device.

13. A motor mechanism according to claim 1 wherein mechanism is provided for starting the rotor by applying an initial rotation thereto.

14. A motor mechanism according to claim 1 in which the rotor member is of low inertia so that the motor is self-starting.

15. A motor mechanism as in claim 2 wherein the oscillating member is supported by a resilient element so as to constitute a resilient oscillatory device.

CECIL FRANK CLIFFORD.
FREDERICK OTTO HORSTMANN.

REFERENCES CITED

The following references are of record in the file of this patent:

UNITED STATES PATENTS

| Number | Name | Date |
| --- | --- | --- |
| 708,769 | Inden | Sept. 9, 1902 |
| 1,788,065 | O'Neal | Jan. 6, 1931 |
| 2,091,841 | Warren | Aug. 31, 1937 |
| 2,109,953 | Bates | Mar. 1, 1938 |
| 2,274,875 | Thompson | Mar. 3, 1942 |
| 2,310,107 | Miller | Feb. 2, 1943 |

FOREIGN PATENTS

| Number | Country | Date |
| --- | --- | --- |
| 822,484 | France | Sept. 10, 1937 |